(12) United States Patent
Guo et al.

(10) Patent No.: US 12,582,127 B1
(45) Date of Patent: Mar. 24, 2026

(54) MULTIFUNCTIONAL NOODLE PRESSING MACHINE

(71) Applicant: FOSHAN SANSHUI DONGNAN ELECTRIC APPLIANCE CO., LTD., Foshan (CN)

(72) Inventors: Yingping Guo, Foshan City (CN); Minxiang Ning, Foshan City (CN)

(73) Assignee: FOSHAN SANSHUI DONGNAN ELECTRIC APPLIANCE CO., LTD., Foshan (CN)

( * ) Notice: Subject to any disclaimer, the term of this patent is extended or adjusted under 35 U.S.C. 154(b) by 0 days.

(21) Appl. No.: 19/281,671

(22) Filed: Jul. 27, 2025

(30) Foreign Application Priority Data

Sep. 23, 2024 (CN) ......................... 202422309420.X

(51) Int. Cl.
    *A21C 11/24* (2006.01)
    *A21C 3/02* (2006.01)
(52) U.S. Cl.
    CPC .............. *A21C 11/24* (2013.01); *A21C 3/024* (2013.01)
(58) Field of Classification Search
    CPC .................................. A21C 3/04; A21C 11/24
    See application file for complete search history.

(56) References Cited

U.S. PATENT DOCUMENTS

| | | | | |
|---|---|---|---|---|
| 625,739 A | * | 5/1899 | Buerk ..................... | A21C 11/24 |
| | | | | 425/294 |
| 4,083,668 A | * | 4/1978 | Bardwick, III ........ | A21C 11/24 |
| | | | | 425/294 |
| 4,289,470 A | * | 9/1981 | Johnston ................ | A21C 11/24 |
| | | | | 425/336 |
| 11,206,837 B2 | * | 12/2021 | Chen ......................... | B26D 3/24 |
| 2021/0153510 A1 | * | 5/2021 | Chen ....................... | A21C 11/24 |
| 2023/0109401 A1 | * | 4/2023 | Ni .......................... | A21C 11/22 |
| | | | | 425/294 |

FOREIGN PATENT DOCUMENTS

| | | | | | |
|---|---|---|---|---|---|
| CN | 110915847 A | * | 3/2020 | ............... | A21C 3/02 |
| CN | 111567590 A | * | 8/2020 | ............... | A21C 3/02 |
| KR | 20110077406 A | * | 7/2011 | ............. | A21C 11/04 |

* cited by examiner

*Primary Examiner* — Seyed Masoud Malekzadeh

(57) ABSTRACT

The present disclosure discloses a multifunctional noodle pressing machine, including a main housing and an upper cover, where a first pressing roller is rotatably connected within the main housing, a second pressing roller is disposed within the main housing, and the first pressing roller and the second pressing roller are spaced apart front and rear; the noodle pressing machine employs the first pressing roller and the second pressing roller to jointly roll and press dough sheets to thin them, and utilizes the deviation between an axis of a connection shaft and an axis of the second pressing roller by providing a knob and the connection shaft, thereby adjusting the distance between the first pressing roller and the second pressing roller through rotation of the knob, so as to extrude dough sheets of different thickness specifications with high adjustability, and an overall structure that is practical and reliable.

10 Claims, 4 Drawing Sheets

MULTIFUNCTIONAL NOODLE PRESSING MACHINE

CROSS-REFERENCE TO RELATED APPLICATIONS

The present disclosure claims the priority of Chinese Patent Application No. 202422309420X filed on Sep. 23, 2024 before CNIPA. All the above are hereby incorporated by reference in their entirety.

TECHNICAL FIELD

The present disclosure relates to the technical field of food machinery, and in particular, to a multifunctional noodle pressing machine.

BACKGROUND

A noodle pressing machine is a food machinery that mixes flour and water evenly to replace traditional manual dough kneading, and can be used to produce noodles, wonton wrappers, pastries, and dough-based products; noodles produced by the noodle pressing machine have high tenacity strength, are resistant to boiling and breaking, and are suitable for use in households, hotels, restaurant canteens, pastry factories, bakeries, and various dough product processing units or individual industrial and commercial households; conventional noodle pressing machines have singular functionality, they can only directly extrude noodles and cannot extrude multiple specifications of noodles, with overall limited functions and low adjustability. With publication number CN219741683U, a noodle pressing machine is disclosed, wherein the noodle pressing machine includes a housing, a pressing shaft, a driving shaft, and an adjustment assembly; the driving shaft is rotatably mounted through the housing, the pressing shaft is movably mounted through the housing, the driving shaft and the pressing shaft are spaced apart to form a space between them for a dough sheet to pass through, the driving shaft and the pressing shaft are drivingly connected; the adjustment assembly includes a connection plate, a cam, and an adjustment shaft, the cam is formed with an eccentric hole, the adjustment shaft is rotatably mounted through the housing and the adjustment shaft is tightly fitted within the eccentric hole; the connection plate is formed with a first mounting hole and a second mounting hole, the cam is rotatably mounted in the first mounting hole, the pressing shaft is rotatably mounted through the second mounting hole; rotation of the adjustment shaft is able to cause the connection plate to swing via the cam, thereby moving the pressing shaft relative to the driving shaft. This noodle pressing machine is unable to extrude multiple specifications of noodles and lacks adjustment functionality.

SUMMARY

In view of the deficiencies of the prior art, an objective of the present disclosure is to provide a multifunctional noodle pressing machine that is practical, reliable, and adjustable.

To achieve the aforementioned objective, the solution provided in the present disclosure is a multifunctional noodle pressing machine, including a main housing and an upper cover, where a first pressing roller is rotatably connected within the main housing, a second pressing roller is disposed within the main housing, the first pressing roller and the second pressing roller are spaced apart front and rear, the first pressing roller and the second pressing roller jointly thin conveyed dough sheets, the upper cover is detachably mounted atop the main housing, the upper cover covers the first pressing roller and the second pressing roller, a knob is rotatably connected to an outer sidewall of the main housing, the knob is connected to a connection shaft, the connection shaft is eccentrically connected to the second pressing roller, with an axis of the connection shaft deviating from an axis of the second pressing roller, whereby rotating the knob adjusts a distance between the first pressing roller and the second pressing roller.

The beneficial effects of the present disclosure are as follows: enabling adjustment of the thickness of extruded dough sheets, the noodle pressing machine achieves this by providing the first pressing roller and the second pressing roller, utilizing the first pressing roller and the second pressing roller to jointly roll and press the dough sheet to thin it, and then by providing the knob and the connection shaft, utilizing the deviation between the axis of the connection shaft and the axis of the second pressing roller, so that rotating the knob adjusts the distance between the first pressing roller and the second pressing roller, thereby extruding dough sheets of different thickness specifications with strong adjustability and an overall structure that is practical and reliable.

In some implementations, a pressing chamber is formed at a middle portion of the main housing, and the first pressing roller and the second pressing roller are positioned within the pressing chamber.

In some implementations, a positioning ring is disposed on the outer sidewall of the main housing, the positioning ring is formed with a plurality of positioning holes, the plurality of positioning holes are arranged annularly at intervals, the knob is provided with a first pin, and the first pin inserts into the positioning holes to restrict rotation of the knob. After adopting the foregoing structure, the present disclosure enables adjusting the distance between the first pressing roller and the second pressing roller according to positioning settings.

In some implementations, a mounting groove is formed in a side wall of the knob, and the mounting groove is configured to mount the first pin.

In some implementations, two conveying rollers are rotatably connected within the pressing chamber, with one conveying roller positioned anterior to the first pressing roller and the other conveying roller positioned posterior to the second pressing roller.

In some implementations, a third pressing roller and a fourth pressing roller are rotatably connected within the pressing chamber, the third pressing roller and the fourth pressing roller are disposed anterior to the first pressing roller, the third pressing roller is formed with a plurality of pressing parts, the fourth pressing roller is formed with a plurality of pressing grooves, the plurality of pressing parts cooperates with the plurality of pressing grooves in one-to-one correspondence to extrude noodles. After adopting the foregoing structure, the present disclosure enables extruding noodles of one thickness specification.

In some implementations, a fifth pressing roller and a sixth pressing roller are rotatably connected within the pressing chamber, the fifth pressing roller and the sixth pressing roller are disposed posterior to the second pressing roller, wherein the fifth pressing roller is formed with a plurality of second pressing parts, the sixth pressing roller is formed with a plurality of second pressing grooves, and the plurality of second pressing part cooperates with the plurality of second pressing groove in one-to-one correspondence to extrude noodles. After adopting the foregoing structure, the present disclosure enables extruding noodles of another thickness specification.

In some implementations, the upper cover is formed with a first feed opening, a second feed opening, and a third feed opening, the first feed opening, the second feed opening, and the third feed opening are in communication with the pressing chamber respectively, the first feed opening faces downward directly between the first pressing roller and the second pressing roller, the second feed opening faces downward directly between the third pressing roller and the fourth pressing roller, the third feed opening faces downward directly between the fifth pressing roller and the sixth pressing roller.

In some implementations, a driving shaft is rotatably connected to the main housing, and the driving shaft drives the first pressing roller, the second pressing roller, the third pressing roller, the fourth pressing roller, the fifth pressing roller, and the sixth pressing roller to rotate respectively.

In some implementations, a plurality of limiting members are disposed on an inner sidewall of the pressing chamber, the upper cover is formed with a plurality of limiting slots, and the plurality of limiting members are snap-fitted with the plurality of limiting slots in one-to-one correspondence to enable detachable mounting of the upper cover onto the main housing. After adopting the foregoing structure, the present disclosure enables detachable mounting of the upper cover for facilitating cleaning of the entire noodle pressing machine.

In some implementations, a plurality of fixing slots are disposed on the inner sidewall of the pressing chamber, a reset spring is disposed within each of the plurality of fixing slots, and the reset spring is connected to the limiting member.

In some implementations, each of the plurality of fixing slots is formed with a first limiting flange, an outer sidewall of each of the plurality of limiting members is formed with a second limiting flange, and the first limiting flange clamps and blocks the second limiting flange to restrict each of the plurality of limiting members from exiting each of the plurality of fixing slots.

In some implementations, a first discharge opening, a second discharge opening, and a third discharge opening are formed at a bottom of the main housing, the first feed opening and the first discharge opening oppose each other vertically, the second feed opening and the second discharge opening oppose each other vertically, the third feed opening and the third discharge opening oppose each other vertically.

In some implementations, each of the plurality of positioning holes is provided with a guide bevel for guiding the first pin to disengage from the corresponding positioning hole, each guide bevel is provided only on one side within the corresponding positioning hole and the first pin is able to disengage from the corresponding positioning hole only via the guide bevel, so as to restrict the knob to unidirectional rotation only.

In some implementations, a distance between the first pressing roller and the second pressing roller progressively decreases during one complete rotation cycle of the knob, as the first pin sequentially engages different positioning holes.

1 main housing; 11 pressing chamber; 12 knob; 121 mounting groove; 122 first pin; 13 positioning ring; 131 positioning hole; 141 first discharge opening; 142 second discharge opening; 143 third discharge opening; 15 limiting member; 151 second limiting flange; 16 fixing slot; 161 reset spring; 162 first limiting flange; 17 driving shaft; 21 first pressing roller; 211 first driving gear; 22 second pressing roller; 221 connection shaft; 222 first driven gear; 23 third pressing roller; 231 first transmission gear; 232 pressing part; 24 fourth pressing roller; 241 second driven gear; 242 pressing groove; 25 conveying roller; 26 fifth pressing roller; 261 third driven gear; 262 second pressing part; 27 sixth pressing roller; 271 second transmission gear; 272 second pressing groove; 3 upper cover; 31 first feed opening; 32 second feed opening; 33 third feed opening; 34 limiting slot.

DETAILED DESCRIPTION

The technical solution of the present disclosure is described in below clearly and completely in conjunction with the accompanying drawings. Evidently, the described embodiments are some of the embodiments of the present disclosure rather than all embodiments. All other embodiments obtained by those of ordinary skill in the art based on the embodiments of the present disclosure without creative efforts shall fall within the scope of protection of the present disclosure.

In the description of the present disclosure, it is to be noted that the terms "central", "up", "down", "left", "right", "vertical", "horizontal", "inside", "outside", if any, and other orientation or position relationships are based on the orientation or position relationships shown in the attached drawings. It is only intended to facilitate description of the present disclosure and simplify description, but not to indicate or imply that the referred device or element has a specific orientation, or is constructed and operated in a specific orientation. Therefore, they should not be construed as a limitation of the present disclosure. Furthermore, the terms "first", "second", "third", if any, are used for descriptive purposes only and are not to be understood as indicating or implying relative importance.

Embodiment 1

Figure 1:
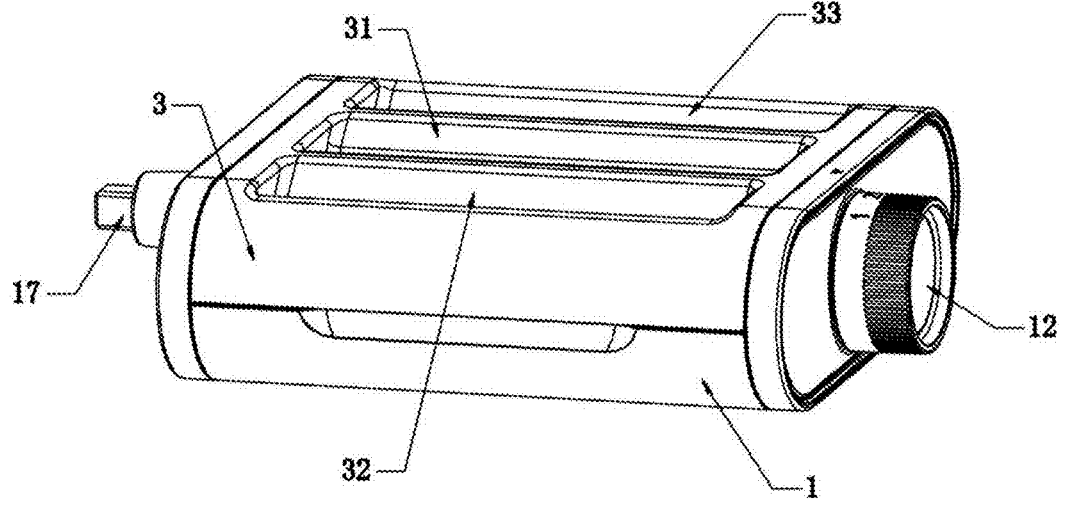
FIG. 1 is a perspective view 1 of the overall structure of the present disclosure.
Figure 2:
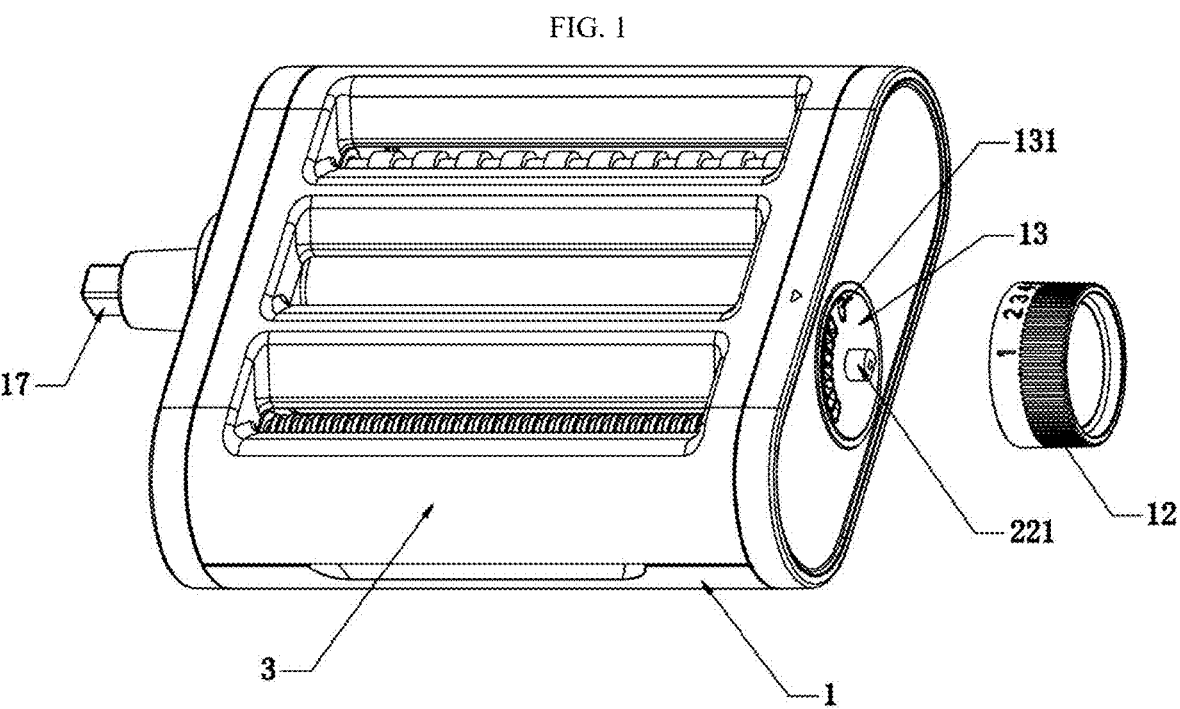
FIG. 2 is a perspective view 2 of the overall structure of the present disclosure.
Figure 3:
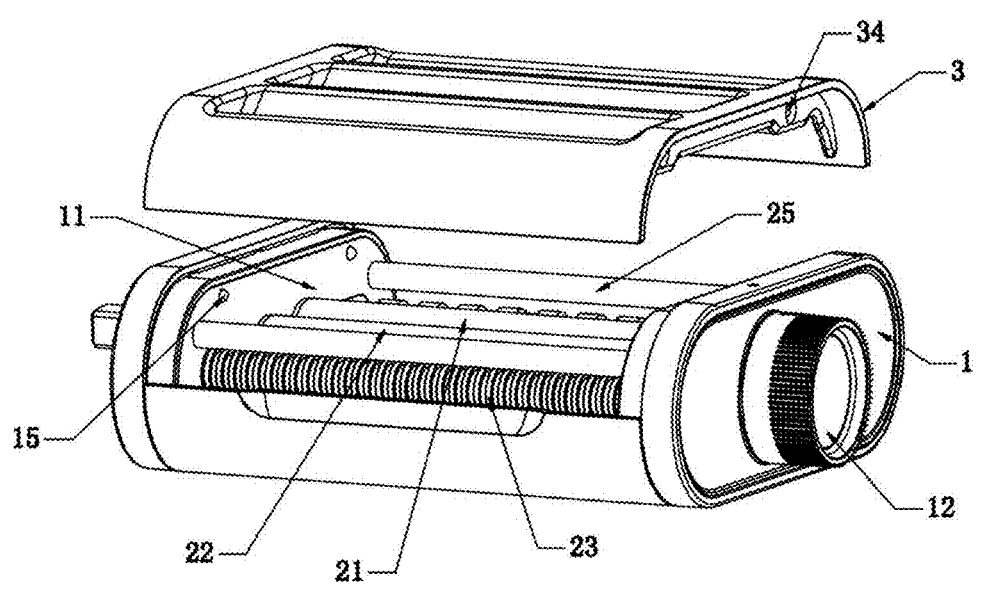
FIG. 3 is a perspective view 3 of the overall structure of the present disclosure.
Figure 4:
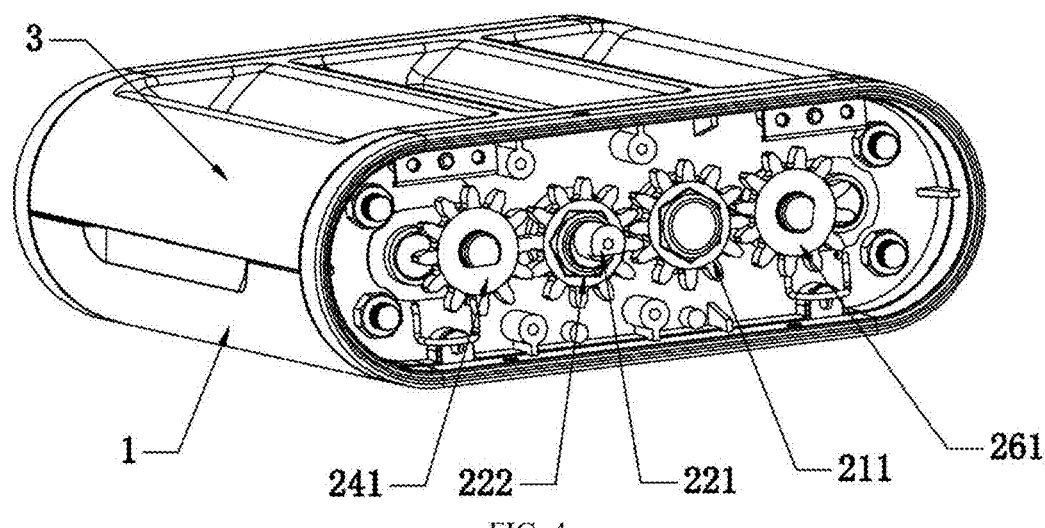
FIG. 4 is a perspective view 4 of the overall structure of the present disclosure.
Figure 5:
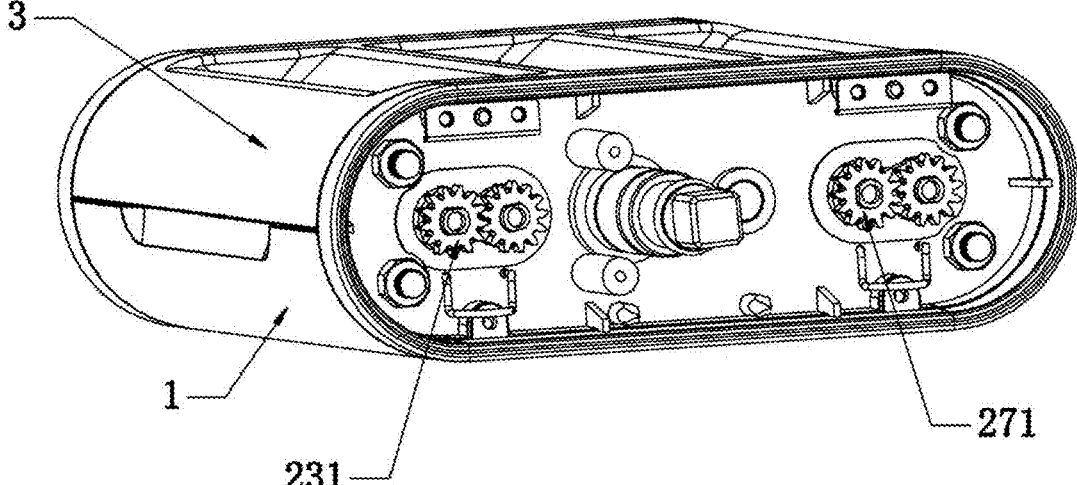
FIG. 5 is a perspective view 5 of the overall structure of the present disclosure.
Figures 6, 7:
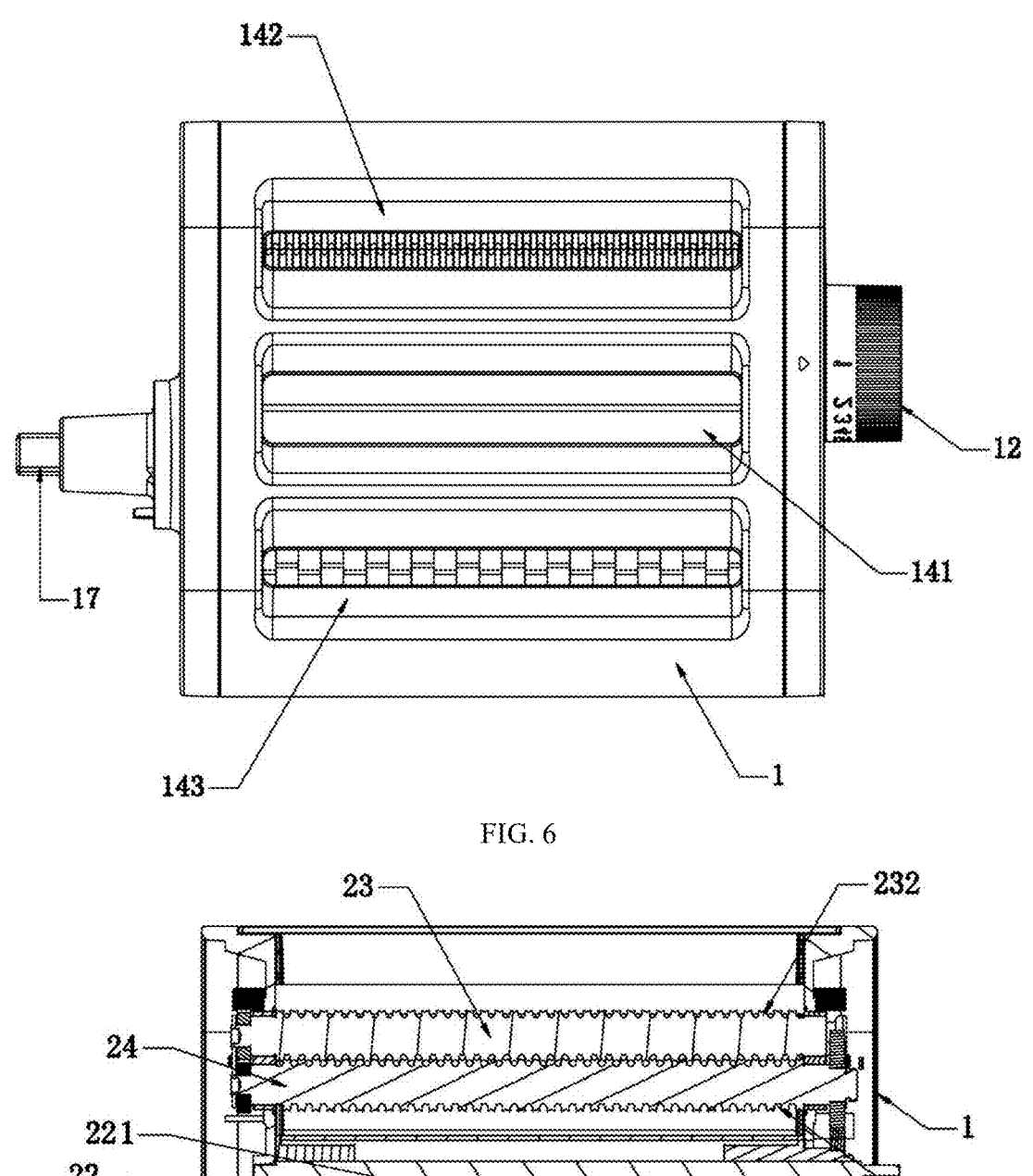
FIG. 6 is a bottom view of the present disclosure.
FIG. 7 is an internal structure view 1 of the present disclosure.
Figures 8, 9, 10:
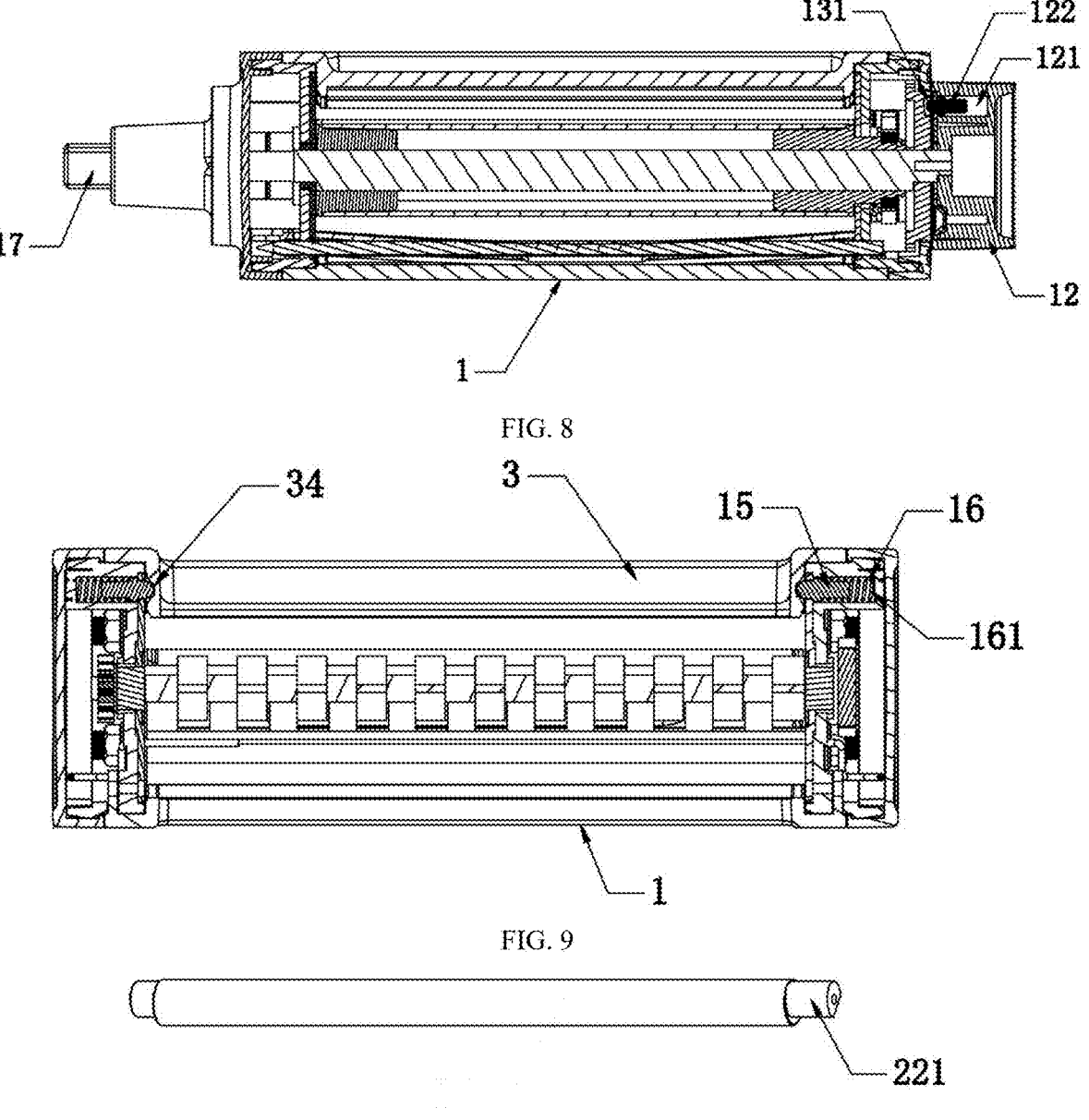
FIG. 8 is an internal structure view 2 of the present disclosure.
FIG. 9 is an internal structure view 3 of the present disclosure.
FIG. 10 is a perspective view of the second pressing roller of the present disclosure.

Referring to FIGS. 1 to 10, a multifunctional noodle pressing machine includes a main housing 1 and an upper cover 3, a first pressing roller 21 is rotatably connected within the main housing 1, a second pressing roller 22 is disposed within the main housing 1, the first pressing roller 21 and the second pressing roller 22 are spaced apart front and rear, the first pressing roller 21 and the second pressing roller 22 jointly thin conveyed dough sheets, the upper cover 3 is detachably mounted atop the main housing, the upper cover 3 covers the first pressing roller 21 and the second pressing roller 22, a knob 12 is rotatably connected to an outer sidewall of the main housing 1, the knob 12 is connected to a connection shaft 221, the connection shaft 221 is eccentrically connected to the second pressing roller 22, with an axis of the connection shaft 221 deviating from an axis of the second pressing roller 22, whereby rotating the knob 12 adjusts a distance between the first pressing roller 21 and the second pressing roller 22.

In the present embodiment, a pressing chamber 11 is formed at a middle portion of the main housing 1, and the first pressing roller 21 and the second pressing roller 22 are positioned within the pressing chamber 11. The positioning ring 13 is formed with a plurality of positioning holes 131, the plurality of positioning holes 131 are arranged annularly at intervals, the knob 12 is provided with a first pin 122, and the first pin 122 inserts into the positioning holes 131 to restrict rotation of the knob 12.

In the present embodiment, two conveying rollers 25 are rotatably connected within the pressing chamber 11, with one conveying roller 25 positioned anterior to the first pressing roller 21 and the other conveying roller 25 positioned posterior to the second pressing roller 22.

In the present embodiment, a third pressing roller 23 and a fourth pressing roller 24 are rotatably connected within the pressing chamber 11, the third pressing roller 23 and the fourth pressing roller 24 are disposed anterior to the first pressing roller 21, the third pressing roller 23 is formed with a plurality of pressing parts 232, the fourth pressing roller 24 is formed with a plurality of pressing grooves 242, the plurality of pressing parts 232 cooperate with the plurality of pressing grooves 242 in one-to-one correspondence to extrude noodles.

In the present embodiment, a fifth pressing roller 26 and a sixth pressing roller 27 are rotatably connected within the pressing chamber 11, the fifth pressing roller 26 and the sixth pressing roller 27 are disposed posterior to the second pressing roller, where the fifth pressing roller 26 is formed with a plurality of second pressing parts 262, the sixth pressing roller 27 is formed with a plurality of second pressing grooves 272, and the plurality of second pressing parts 262 cooperate with the plurality of second pressing grooves 272 in one-to-one correspondence to extrude noodles.

In the present embodiment, the first pressing part 232 and the second pressing part 262 are cylindrical structures, a width of the first pressing part 232 being less than that of the second pressing part 262, and a width of the first pressing groove 242 being less than that of the second pressing groove 272.

In the present embodiment, the upper cover 3 is formed with a first feed opening 31, a second feed opening 32, and a third feed opening 33, the first feed opening 31, the second feed opening 32, and the third feed opening 33 are in communication with the pressing chamber 11 respectively, the first feed opening 31 faces downward directly between the first pressing roller 21 and the second pressing roller 22, the second feed opening 32 faces downward directly between the third pressing roller 23 and the fourth pressing roller 24, the third feed opening 33 faces downward directly between the fifth pressing roller 26 and the sixth pressing roller 27. A plurality of limiting members 15 are disposed on an inner sidewall of the pressing chamber 11, the upper cover 3 is formed with a plurality of limiting slots 34, and the plurality of limiting members 15 are snap-fitted with the plurality of limiting slots 34 in one-to-one correspondence to enable detachable mounting of the upper cover 3 onto the main housing 1. A plurality of fixing slots 16 are disposed on the inner sidewall of the pressing chamber 11, a reset spring 161 is disposed within each of the plurality of fixing slots 16, and the reset spring 161 is connected to the limiting member 15.

In the present embodiment, each of the plurality of fixing slots 16 is formed with a first limiting flange 162, an outer sidewall of each of the plurality of limiting members 15 is formed with a second limiting flange 151, and the first limiting flange 162 clamps and blocks the second limiting flange 151 to restrict each of the plurality of limiting members 15 from exiting each of the plurality of fixing slots 16.

In the present embodiment, a first discharge opening 141, a second discharge opening 142, and a third discharge opening 143 are formed at a bottom of the main housing 1, the first feed opening 31 and the first discharge opening 141 oppose each other vertically, the second feed opening 32 and the second discharge opening 142 oppose each other vertically, the third feed opening 33 and the third discharge opening 143 oppose each other vertically.

In the present embodiment, an end of the first pressing roller 21 is connected to a first driving gear 211, and an opposite end thereof is connected to a driving shaft 17; an end of the second pressing roller 22 is connected to a connection shaft 221, and an opposite end thereof is coaxially connected to a first driven gear 222; the third pressing roller 23 is coaxially connected to a first transmission gear 231; an end of the fourth pressing roller 24 is connected to the first transmission gear 231, and an opposite end thereof is connected to a second driven gear 241; an end of the fifth pressing roller 26 is connected to a second transmission gear 271, and an opposite end thereof is connected to a third driven gear 261; and the sixth pressing roller 27 is connected to a second transmission gear 271.

The first driving gear 211 meshes with both the first driven gear 222 and the third driven gear 261, respectively; the first driven gear 222 meshes with the second driven gear 241; the two first transmission gears 231 mesh with each other; and the two second transmission gears 271 mesh with each other.

In the present embodiment, there are three functions: First, starting a motor causes the motor to drive the driving shaft 17 to rotate, thereby driving the first pressing roller 21 to rotate. The first pressing roller 21, through the first driving gear 211, respectively meshes with the first driven gear 222 and the third driven gear 261, while the first driven gear 222 meshes with the second driven gear 241, thereby driving the second pressing roller 22, the fourth pressing roller 24, and the fifth pressing roller 26 to rotate, respectively. Subsequently, the meshing between the two first transmission gears 231 causes the fourth pressing roller 24 to drive the third pressing roller 23 to rotate, and the meshing between the two second transmission gears 271 causes the fifth pressing roller 26 to drive the sixth pressing roller 27 to rotate.

When the dough sheeting function is required, the dough sheet is directly fed from the first feed opening 31, then jointly rolled and pressed by the first pressing roller 21 and the second pressing roller 22 to thin the dough sheet, thereby realizing the dough sheeting function;

When the noodle extruding function is required, the dough sheet is directly fed from the second feed opening 32, then jointly rolled and pressed by the plurality of first pressing parts 232 of the third pressing roller 23 and the plurality of first pressing grooves 242 of the fourth pressing roller 24 to extrude the dough sheet into thin noodles, thereby realizing the noodle extruding function;

When the noodle extruding function is required, the dough sheet is directly fed from the third feed opening 33, then jointly rolled and pressed by the plurality of second pressing parts 262 of the fifth pressing roller 26 and the plurality of second pressing grooves 272 of the sixth pressing roller 27 to extrude the dough sheet into thick noodles, thereby realizing the noodle extruding function.

When it is required to adjust the dough sheeting thickness or the thickness of extruded dough sheets, rotate the knob 12 to cause the first pin 122 to turn until reaching the desired position, then insert the first pin 122 into the corresponding positioning hole 131. The rotation of knob 12 drives the connection shaft 221 to rotate. Since the axis of connection shaft 221 deviates from the axis of the second pressing roller 22, this causes the second pressing roller 22 to move toward or away from the first pressing roller 21, thereby adjusting the distance between the first pressing roller 21 and the second pressing roller 22 and consequently regulating the thickness of extruded dough sheets. Here, there are eight positioning holes 131 corresponding to eight positions, enabling extrusion of dough sheets at eight thickness specifications.

When it is required to disassemble and clean or replace the first pressing roller 21, the second pressing roller 22, the third pressing roller 23, the fourth pressing roller 24, the fifth pressing roller 26, and the sixth pressing roller 27, simply pull the upper cover 3 upward with force, causing the limiting members 15 to disengage from the limiting slots 34 and the reset springs 161 to be compressed, thereby enabling cleaning of the upper cover and the interior of the main housing 1, with overall cleaning convenience; when reinstalling the upper cover 3, press the upper cover downward with force to align the fixing slots 16 with the limiting slots 34, allowing the reset springs 161 to rebound and push the limiting members 15 to move back into the limiting slots 34.

Embodiment 2

Compared with Embodiment 1, the difference in the present embodiment is that the knob 12 is able to only rotate unidirectionally. To achieve the technical effect, the specific solution adopted is as follows:

Each of the plurality of positioning holes 131 is provided with a guide bevel for guiding the first pin 122 to disengage from the corresponding positioning hole 131, each guide bevel is provided only on one side within the corresponding positioning hole 131 and the first pin 122 is able to disengage from the corresponding positioning hole 131 only via the guide bevel. The first pin 122 is unable to disengage from the opposite side of the positioning holes 131, thereby restricting the first pin to switch between positioning holes 131 only along a designated sequence. The sequence of positioning holes 131 correlates with the rotation direction of the knob 12, therefore enabling restriction of the rotation direction of the knob 12 through the above structure.

Additionally, in the present embodiment, a distance between the first pressing roller 21 and the second pressing roller 22 progressively decreases during one complete rotation cycle of the knob 12, as the first pin 122 sequentially engages different positioning holes 131. By restricting the rotation direction of the knob 12 and combining it with the aforementioned solution, potential deflection of the connection shaft 221 caused by dough extrusion on the second pressing roller 22 during pressing may be avoided. This prevents changes in the spacing between the first pressing roller 21 and the second pressing roller 22, thus avoiding uneven dough sheet thickness.

The embodiments described above are merely preferable embodiments of the present disclosure and do not impose any formal limitations on the present disclosure. Any person skilled in the art may utilize the disclosed technical contents to make more possible modifications, refinements, or amendments to equivalent changes in the technical solution of the present disclosure, without departing from the scope of the technical solution of the present disclosure. Therefore, all equivalent variations made based on the concept of the present disclosure that do not depart from the technical solution shall be covered within the protection scope of the present disclosure.

What is claimed is:

1. A multifunctional noodle pressing machine, comprising a main housing and an upper cover, wherein a first pressing roller is rotatably connected within the main housing, a second pressing roller is disposed within the main housing, the first pressing roller and the second pressing roller are spaced apart front and rear, the first pressing roller and the second pressing roller jointly thin conveyed dough sheets, the upper cover is detachably mounted atop the main housing, the upper cover covers the first pressing roller and the second pressing roller, a knob is rotatably connected to an outer sidewall of the main housing, the knob is connected to a connection shaft, the connection shaft is eccentrically connected to the second pressing roller, with an axis of the connection shaft deviating from an axis of the second pressing roller, whereby rotating the knob adjusts a distance between the first pressing roller and the second pressing roller;

wherein a positioning ring is disposed on the outer sidewall of the main housing, the positioning ring is formed with a plurality of positioning holes, the plurality of positioning holes are arranged annularly at intervals, the knob is provided with a first pin, and the first pin inserts into the positioning holes to restrict rotation of the knob;

wherein each of the plurality of positioning holes is provided with a guide bevel for guiding the first pin to disengage from the corresponding positioning hole, each guide bevel is provided only on one side within the corresponding positioning hole and the first pin is able to disengage from the corresponding positioning hole only via the guide bevel, so as to restrict the knob to unidirectional rotation only.

2. The multifunctional noodle pressing machine according to claim 1, wherein a pressing chamber is formed at a middle portion of the main housing, and the first pressing roller and the second pressing roller are positioned within the pressing chamber.

3. The multifunctional noodle pressing machine according to claim 2, wherein two conveying rollers are rotatably connected within the pressing chamber, with one conveying roller positioned anterior to the first pressing roller and the other conveying roller positioned posterior to the second pressing roller.

4. The multifunctional noodle pressing machine according to claim 3, wherein a third pressing roller and a fourth pressing roller are rotatably connected within the pressing chamber, the third pressing roller and the fourth pressing roller are disposed anterior to the first pressing roller, the third pressing roller is formed with a plurality of pressing parts, the fourth pressing roller is formed with a plurality of pressing grooves, the plurality of pressing parts cooperate with the plurality of pressing grooves in one-to-one correspondence to extrude noodles.

5. The multifunctional noodle pressing machine according to claim 4, wherein a fifth pressing roller and a sixth pressing roller are rotatably connected within the pressing chamber, the fifth pressing roller and the sixth pressing roller are disposed posterior to the second pressing roller, wherein the fifth pressing roller is formed with a plurality of second pressing parts, the sixth pressing roller is formed with a plurality of second pressing grooves, and the plurality of second pressing parts cooperate with the plurality of second pressing grooves in one-to-one correspondence to extrude noodles.

6. The multifunctional noodle pressing machine according to claim 5, wherein the upper cover is formed with a first feed opening, a second feed opening, and a third feed opening, the first feed opening, the second feed opening, and the third feed opening are in communication with the pressing chamber respectively, the first feed opening faces downward directly between the first pressing roller and the second pressing roller, the second feed opening faces downward directly between the third pressing roller and the fourth pressing roller, the third feed opening faces downward directly between the fifth pressing roller and the sixth pressing roller.

7. The multifunctional noodle pressing machine according to claim 1, wherein a plurality of limiting members are disposed on an inner sidewall of the pressing chamber, the upper cover is formed with a plurality of limiting slots, and the plurality of limiting members are snap-fitted with the plurality of limiting slots in one-to-one correspondence to enable detachable mounting of the upper cover onto the main housing.

8. The multifunctional noodle pressing machine according to claim 7, wherein a plurality of fixing slots are disposed on the inner sidewall of the pressing chamber, a reset spring is disposed within each of the plurality of fixing slots, and the reset spring is connected to the plurality of limiting members.

9. The multifunctional noodle pressing machine according to claim 8, wherein a first discharge opening, a second discharge opening, and a third discharge opening are formed at a bottom of the main housing, the first feed opening and the first discharge opening oppose each other vertically, the second feed opening and the second discharge opening oppose each other vertically, the third feed opening and the third discharge opening oppose each other vertically.

10. The multifunctional noodle pressing machine according to claim 3, wherein a distance between the first pressing roller and the second pressing roller progressively decreases during one complete rotation cycle of the knob, as the first pin sequentially engages different positioning holes.

* * * * *